US008020629B1

(12) United States Patent
McFarlane et al.

(10) Patent No.: US 8,020,629 B1
(45) Date of Patent: Sep. 20, 2011

(54) LOW-DISTURBANCE TILLAGE TOOL (75) Inventors: Stanley McFarlane, Sauk City, WI (US); Aaron J. Faessler, Cross Plains, WI (US); Rick K. Kohn, Prairie du Sac, WI (US)

(73) Assignee: McFarlane Manufacturing Co., Inc., Sauk City, WI (US)

( * ) Notice: Subject to any disclaimer, the term of this patent is extended or adjusted under 35 U.S.C. 154(b) by 0 days.

(21) Appl. No.: 12/470,318

(22) Filed: May 21, 2009

Related U.S. Application Data (60) Provisional application No. 61/055,026, filed on May 21, 2008.

(51) Int. Cl.
*A01B 49/02* (2006.01)

(52) U.S. Cl. ........ 172/145; 172/149; 172/178; 172/181; 172/604

(58) Field of Classification Search .................. 172/133, 172/145–149, 153–158, 604, 174, 178, 181, 172/518, 558, 579, 599, 594–596
See application file for complete search history.

(56) References Cited

U.S. PATENT DOCUMENTS

| 467,400 | A | * | 1/1892 | Denney et al. ................. 172/558 |
| 471,209 | A | * | 3/1892 | Cordes ........................ 172/599 |
| 1,747,052 | A | | 2/1930 | Cody |
| 2,994,388 | A | | 8/1961 | Ryan |
| 3,090,447 | A | | 5/1963 | Hotchkiss, Jr. |
| 4,127,178 | A | | 11/1978 | Blair |
| 4,131,163 | A | | 12/1978 | Bezzerides |
| 4,180,005 | A | | 12/1979 | Zumbahlen |
| 4,212,254 | A | | 7/1980 | Zumbahlen |
| 4,245,706 | A | | 1/1981 | Dietrich, Jr. |
| 4,250,970 | A | | 2/1981 | Pfenninger et al. |
| 4,313,503 | A | | 2/1982 | Good et al. |
| 4,361,191 | A | | 11/1982 | Landoll et al. |
| 4,703,810 | A | | 11/1987 | Meiners |
| 5,052,495 | A | | 10/1991 | McFarlane et al. |
| 5,207,279 | A | | 5/1993 | Nelson et al. |
| 5,474,135 | A | | 12/1995 | Schlagel |

(Continued)

FOREIGN PATENT DOCUMENTS

| FR | 821621 | 5/1937 |
| GB | 2136463 | 10/1984 |

OTHER PUBLICATIONS http://www.landoll.com/ag/PDF/7430%20VT%20Plus.pdf.*

(Continued)

*Primary Examiner* — Robert Pezzuto
*Assistant Examiner* — Matthew Troutman
(74) *Attorney, Agent, or Firm* — Lathrop & Clark LLP (57) ABSTRACT

A low till agricultural implement has a frame with a hitch for attachment to a tractor. An shallow-angled blade gang composed of an array of parallel ultra-shallow inclined disk blades is mounted to the front of the frame, and is followed by at least one wheel, spiral reel, and spike tooth harrow. The ultra-shallow inclined disk blades are mounted perpendicular to rotating shafts, and slice through field residue and soil with minimal lateral movement of material. The blades of the following reel then make cuts nearly perpendicular to those made by the circular blades. A trailing rolling basket or other finishing implement follows the spiral reel. The implement aids in drying the soil surface layer. Also, by cutting up residue and evenly spreading debris and topsoil, the implement helps to warm up the soil.

18 Claims, 7 Drawing Sheets

U.S. PATENT DOCUMENTS

| | | | |
|---|---|---|---|
| 5,544,709 | A | 8/1996 | Lowe et al. |
| 5,622,227 | A | 4/1997 | McDonald |
| 5,632,343 | A | 5/1997 | Gengler |
| 6,554,078 | B1 * | 4/2003 | McDonald ................. 172/69 |
| 6,557,646 | B1 * | 5/2003 | Hurtis et al. ............... 172/156 |
| 6,612,381 | B2 * | 9/2003 | Powell et al. ............... 172/586 |
| 6,698,525 | B2 | 3/2004 | McFarlane |
| 6,896,068 | B2 * | 5/2005 | Dietrich et al. ............. 172/145 |
| 7,017,675 | B2 * | 3/2006 | Ankenman et al. ......... 172/146 |
| 7,188,680 | B2 * | 3/2007 | Almen ........................ 172/397 |
| 2003/0085044 | A1 * | 5/2003 | McFarlane .................. 172/146 |
| 2004/0149459 | A1 * | 8/2004 | Powell et al. ............... 172/145 |
| 2005/0173135 | A1 * | 8/2005 | Almen ........................ 172/133 |

OTHER PUBLICATIONS http://www.discplough.com/productlist.html.*

Windosr Prior Art Date Documentation.*

"Super-Till is the Ultimate . . . ", Amco Products, Yazoo City, Mississippi.

"Strawmaster", Degelman Industries, Ltd., Saskatchewan, California.

"Spiral Reel Stalk Chopper", McFarlane Mfg. Co., Inc., Sauk City, Wisconsin.

"Farm Equipment", Nov./Dec. 2001, Cover and p. 32.

"VersaTill: Maximum Tillage Versatility" printout from Bigham Brothers, Inc. website, http://www.bighambrothers.com/versatil.htm, Nov. 8, 2001, p. 4.

"Sunflower" website pp. 1-4, http://www.sunflower-mfg.com/products/6000features.asp, Mar. 2, 2007.

Gates Manufacturing Inc., "Magnum Coulter Disks", www.gatesmfg.net/products page/coulter disk.htm, printed Sep. 23, 2010.

* cited by examiner

FIG. 7

LOW-DISTURBANCE TILLAGE TOOL

PRIORITY

This application claims priority to U.S. Provisional Application 61/055,026 filed May 21, 2008, which is incorporated herein by reference in its entirety.

BACKGROUND

1. Field of the Invention

The present disclosure relates to an implement for use in preparing fields for planting. More particularly, it relates to an implement that cuts crop residue and mixes it with the top soil, loosens the top soil, and levels the top soil.

2. Related Art

When preparing a seedbed, it is necessary to break apart crop residue and loosen the top soil. Many implements have been devised to work the soil and prepare it to best receive seeds. For example, rotating reels slice surface material; plows, shanks, and cupped disks horizontally till the soil; and spike tooth harrows loosen the soil. Yet, each time that a tractor pulls an implement across a field, there is the possibility of compacting the soil and thereby lessening the quality of the seedbed. Moreover, each crossing of the field by a tractor represents an additional investment of labor, fuel, and machine wear, which factors into the cost of producing a commodity that is competitively priced. To minimize the steps of seedbed preparation, low-till methods have been developed which involve chopping the plant residue while disturbing only the top layer of soil. These low-till methods allow plant residue to remain largely unburied on the soil surface. When crop residue remains on the surface, the soil better retains moisture and the residue reduces erosion caused by air and water. Moreover, exposed crop residue on the surface, because it is exposed to the air, decomposes, which returns nutrients to the soil.

Recently developed crop varieties have increased resistance to attack by insects, fungi, and disease. Unfortunately, the residue from these plants also show decreased rates of degradation after harvest, which can impede subsequent plantings by clogging equipment. It has been reported that chopping the residue of resistant corn stalks and mixing them with the topsoil, which contains many of the microbes that break down dead plant material, is the best way to accelerate decomposition of plant residue prior to the next planting.

Low-till methods can require multiple tilling operations to be performed by different agricultural devices. To save time and energy, existing agricultural implements have consolidated these devices onto a single trailer that is pulled behind a tractor. For example, a single implement such as the Amco ST2 SUPER-TILL™ seedbed conditioner has two rows of live leaf or Danish shanks, followed by chopper reels, spike tooth harrows, and a choice of a drag board, double rolling baskets, or a drag pipe as a rear finishing attachment. However, the rows of shanks produce excessive horizontal tillage, contributing to undesirable soil compaction.

The McFarlane REEL SEEDBED CONDITIONER™ stalk chopper, manufactured by the McFarlane Manufacturing Co., Inc., of Sauk City, Wis., has a spiral reel, followed by a flexible spike tooth harrow, with a trailing spreader board. The McFarlane REEL TILL™ (see U.S. Pat. No. 6,698,525), also manufactured by McFarlane Manufacturing Co., has a straight coulter, a spiral reel, spike tooth harrow, and feathering board. These implements avoid horizontal tillage, and fields treated by such an apparatus tend to have well developed plant root structures. The straight coulter design causes horizontal tillage only to the extent that soil is pushed aside by the width of the straight blades. When operated in firmer soil conditions, the straight coulters of the REEL TILL™ may not create effective minimal horizontal tillage as required for optimum seedbed preparation.

Because improved seedbed conditions can result in improved yields, and hence greater profitability, there is a continuing need for a combination of field treatments that will result in optimal crop growing conditions. What is needed is a low-till agricultural implement that can prepare a superior seedbed by chopping up plant residue and controlling how much is left as ground cover, while loosening only a minimal top layer of soil and minimizing soil compaction.

SUMMARY

This disclosure relates to an ultra-shallow inclined disk blade for an agricultural implement comprising a circular blade with a front side with an inclined depth, a diameter, and a ratio of diameter to depth from about 16:1 to about 32:1.

This disclosure also relates to a disk blade gang comprising a plurality of ultra-shallow inclined disk blades wherein the disk blades comprise a circular blade with a front side with an inclined depth, a diameter, and a ratio of diameter to depth from about 16:1 to about 32:1, a shaft on which the plurality of ultra-shallow inclined disk blades are mounted, and a crossbeam positioned upwardly of the ultra-shallow inclined disk blades to which the shaft is joined.

This disclosure also relates to a minimal tillage agricultural implement comprising a frame having a hitch for attachment to a vehicle, the frame extending rearwardly from the hitch and being capable of being pulled by the vehicle in a direction of travel; at least one disk blade gang with a plurality of ultra-shallow inclined disk blades wherein the blades are aligned from about 5 degrees to about 13 degrees from parallel to the implement's direction of travel positioned rearwardly of the hitch; at least one wheel adjustably mounted to the frame rearwardly of the ultra-shallow inclined disk blade gang; and at least one reel assembly mounted to the frame rearwardly of the wheel.

These and other features and advantages of various embodiments of systems and methods according to this invention are described in, or are apparent from, the following detailed description of various exemplary embodiments of various devices, structures, and/or methods according to this invention.

BRIEF DESCRIPTION OF THE DRAWINGS

Various exemplary embodiments of the systems and methods according to the present disclosure will be described in detail, with reference to the following figures, wherein.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

The disclosed implement performs multiple tilling operations at the same time. Horizontal tillage inherently creates soil regions of greater or lesser compaction or density. When the plant's roots encounter a more compacted portion of soil, the root will often divert around it, detrimentally consuming plant resources, which reduces the overall crop yield. However, some minimal horizontal tillage is often helpful, especially in hard soil, to loosen the soil sufficiently to prepare a proper seedbed and for other tools, such as a spiral reel, to be effective. To achieve only the minimal but needed horizontal tillage, the disclosed implement utilizes an ultra-shallow disk blades disposed at a shallow angle to the implement's direction of travel to achieve limited minimal horizontal tillage without undue soil compaction. Additional tools, such as a spiral chopping reel, a harrow, and a rolling basket fully mix and condition the top layer of soil. In this manner, the disclosed implement offers improved residue cutting, better tillage, and a more firm and level seedbed. The disclosed implement creates a better seedbed and enables better control of the amount of crop residue left on the surface of top soil.

Figure 1:
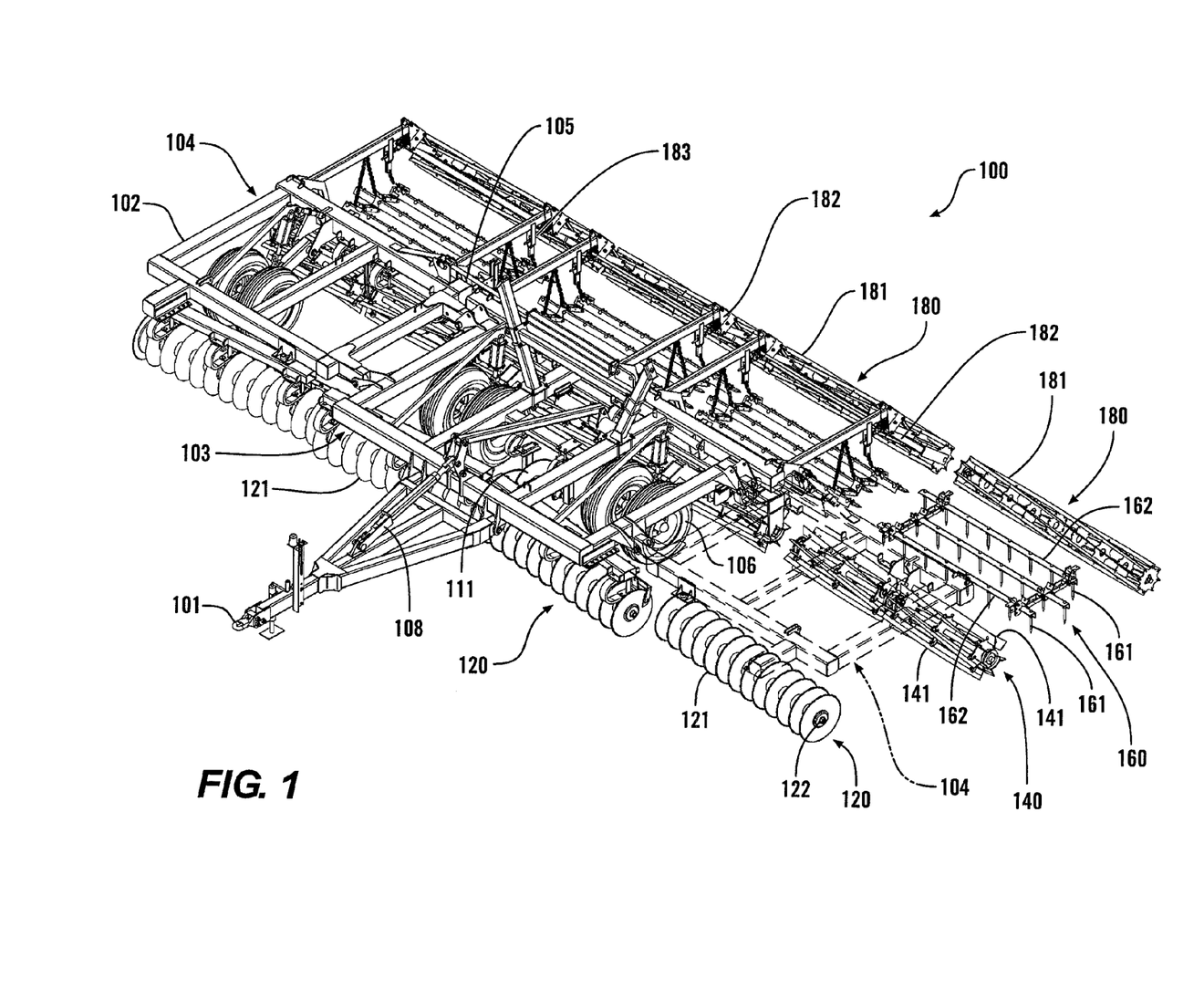
FIG. 1 is an isometric view of an agricultural implement with portions of the frame broken away to show portions of the tilling assemblies mounted thereon according to an exemplary embodiment.
Figure 2:
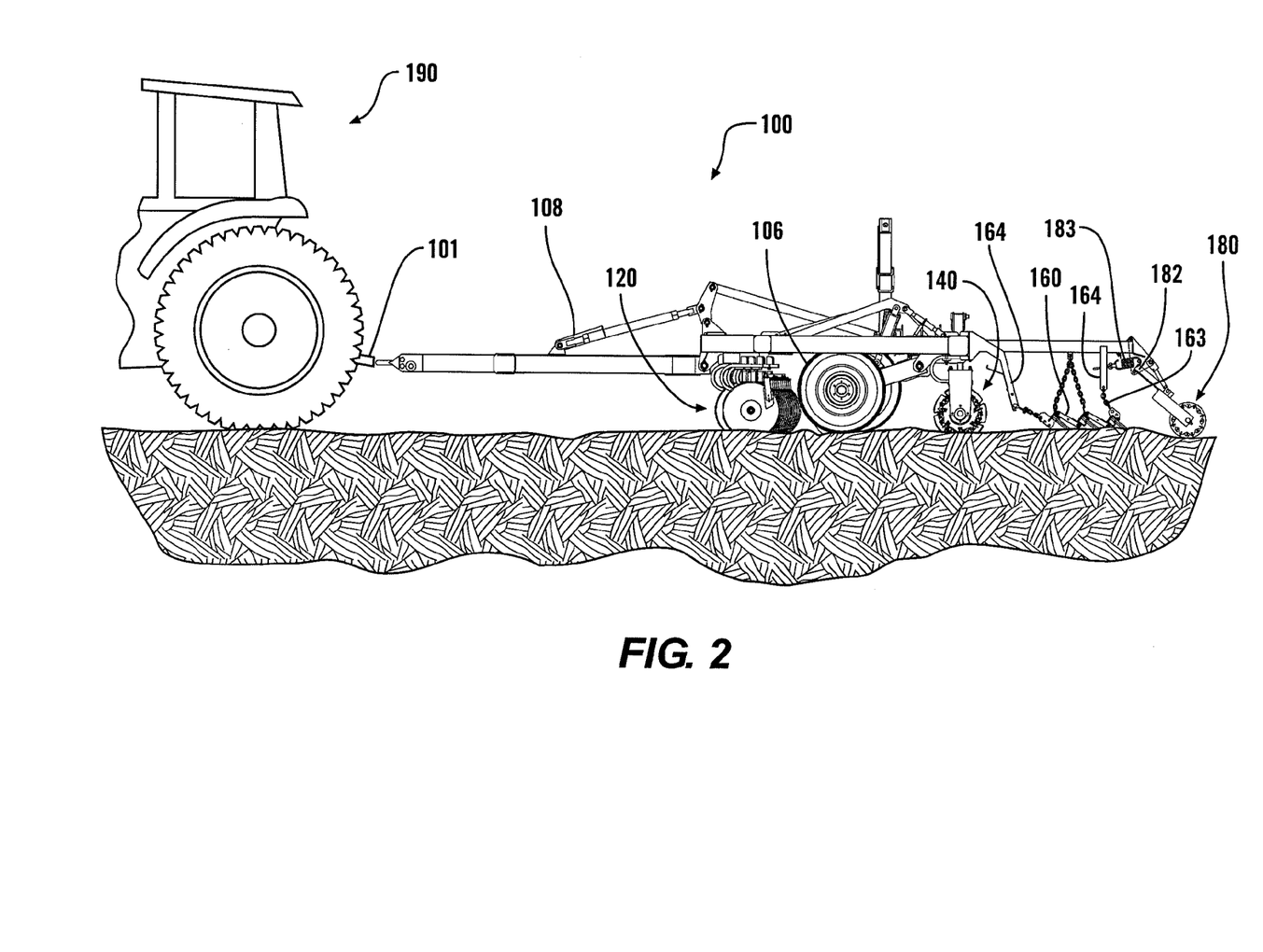
FIG. 2 is a side elevational view of an agricultural implement according to the embodiment of FIG. 1.

In various embodiments, as illustrated in FIGS. 1 and 2, the disclosed device comprises an ultra-shallow inclined disk blade gang 120 and spiral chopping reel 140 that loosen top soil and slice crop residue both nearly parallel and approximately perpendicular to the implement's direction of travel, respectively. By this arrangement, nearly all crop residue of significant size will be cut and/or chopped by at least one of these two tools.

The ultra-shallow inclined disk blade gang 120 operating alone cuts crop residue to the extent that the residue is oriented with a substantial dimension roughly perpendicular to the implement's direction of travel. Conversely, the spiral reel assembly 140 cuts crop residue to the extent that the residue is oriented with a substantial dimension roughly parallel to the implement's direction of travel. Therefore, the combination of the ultra-shallow inclined disk blade gang 120 with ultra-shallow inclined disk blades 121 and spiral chopping reel 140 achieves better cutting of crop residue because most residue will be cut by both devices and virtually all residue will be cut by at least one of the two devices (ultra-shallow inclined disk blade gang 120 or spiral reel 140) no matter how it is oriented (generally, only smaller pieces of residue that do not need to be cut smaller will be missed entirely).

Figure 7:
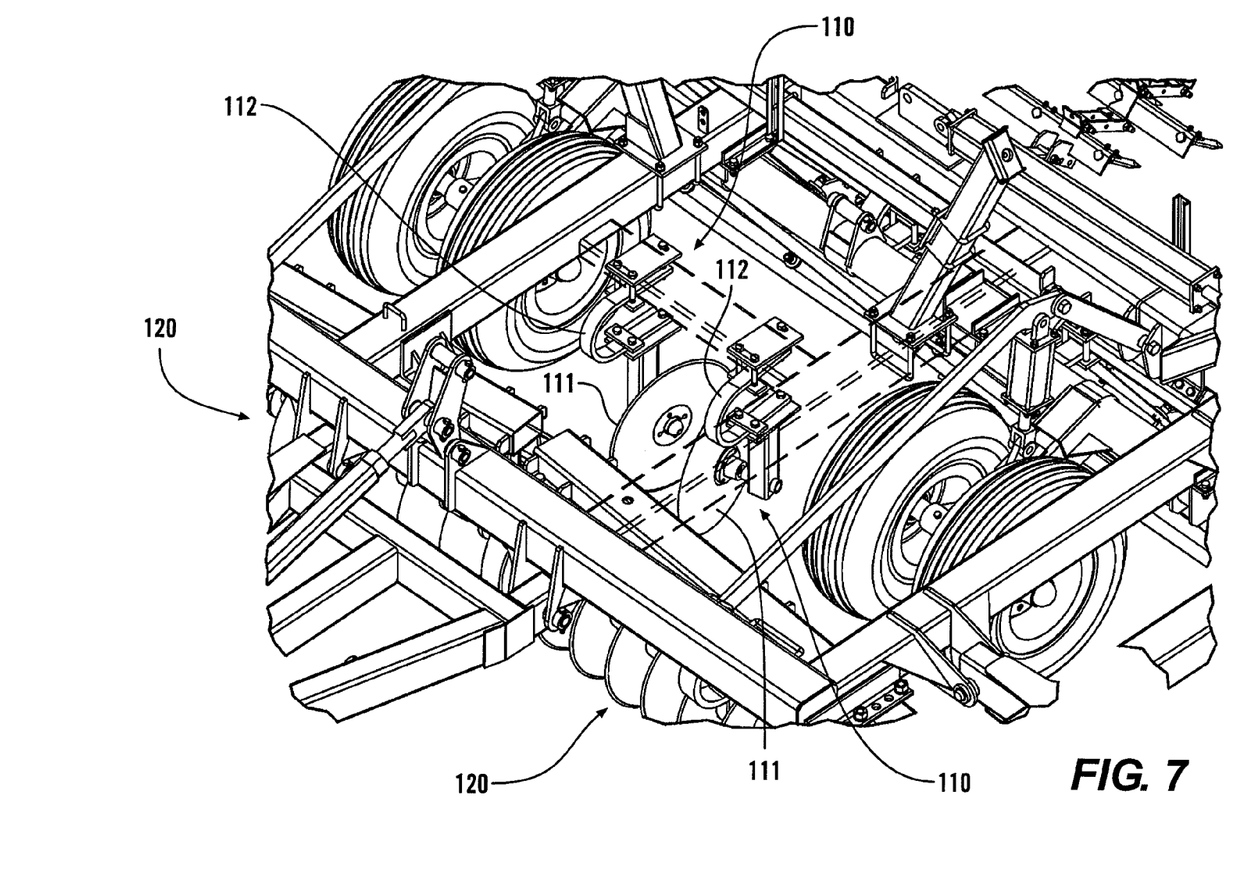
FIG. 7 is a partial isometric view of an agricultural implement according to the embodiment of FIG. 1.

Referring again to FIGS. 1 and 2, in various embodiments, a second tilling assembly is a spiral blade reel assembly 140 which is attached to the frame 102 rearwardly of the ultra-shallow inclined disk blade gang 120. In various embodiments, the reel assembly 140 has seven spiral blades 141 mounted to a shaft that rotates as the spiral blades 141 engage the top soil. Other embodiments of the spiral reel assembly 140 may have a different number of spiral blades (e.g., five blades). The spiral blades 141, which in various embodiments have a beveled outer cutting edge, thus extend across the path of the implement 100, and the blade soil entry and cutting angles are roughly perpendicular to the cutting action of the ultra-shallow inclined disk blades 121. The reel assemblies 140 have brackets 142 which are spring-mounted to the frame 102. The spiral blades 141 contact the top soil to further chop plant residue and loosen the top soil. The reel assemblies 140 will generally cut about 2-3 inches into the ground. The relative depths to which the spiral blades 141 and the ultra-shallow inclined disk blades 121 extend into the ground may be adjusted by controlling the disposition of weight on to the ultra-shallow inclined disk blade gang 120 and the spiral blade reel assembly 140 by pivoting the frame through the front hitch linear adjustment mechanism 108 (e.g., turnbuckle), which is pivotally coupled to both the hitch 101 and the frame 102 as best shown in FIGS. 1-2 and 7, and by the selected level of the wheels 106. In various embodiments, the spiral blade reel has a diameter of about 18 inches. In various exemplary embodiments, as shown in FIGS. 1 and 2, the spiral reel assemblies 140 are positioned with their axles substantially perpendicular to the direction of travel of the implement 100. In various exemplary embodiments, as shown in FIGS. 1 and 2, the spiral reel assemblies 140 are substantially coaxially aligned.

In various embodiments, as shown in FIGS. 1 and 2, a harrow assembly 160 is coupled to rearwardly extending portions of the frame 102 behind the spiral blade reel assemblies 140. The harrow assembly 160 may be any conventional flexible harrow arrangement, for example a spike tooth harrow, having multiple rigid side-to-side harrow bar members 162 to which a plurality of spike teeth 161 are fixed. The harrow bar members 162 are connected together by pivoting links. In transit, when the implement does not engage the field, the harrow assembly 160 is suspended from chains 163 from front, middle and back vertical projections 164 which extend downwardly from rearwardly extending portions of the frame 102. In use, the spike teeth 161 engage the ground, and the front chains 163 drag the harrow assembly 160 across the field. The harrow assembly 160 finishes off the field, scattering residue, breaking up clumps, and conditioning the top soil.

In various embodiments, as shown in FIGS. 1 and 2, the implement 100 may be provided with a finishing tool, such as a single rolling basket 180, mounted on rearwardly angled braces 182. The braces 182 are biased downward by springs 183, which permit the rolling basket 180 to release upwardly when encountering an obstruction such as a stone. In various embodiments, the rolling basket 180 may be set to engage the field or run a selected height over the field. In some embodiments, the rolling basket has a diameter of about 12 inches and features eight flat-edge bars 181 with adjustable down pressure. The pressure can be increased for aggressive clod sizing or decreased for soil separating and conditioning. In various embodiments, the rolling basket 180 runs in engagement with the field.

In various embodiments, the implement 100 is pulled by a vehicle such as a tractor 190 and has a conventional self-leveling hitch 101, which is pivotably coupled to the front end of the frame 102, as shown in FIGS. 1 and 2. In most embodiments, wheels 106 with rubber tires are mounted beneath the frame, and are mounted on axles which are adjustable with hydraulic actuators to extend the wheels for road transport, and to retract the wheels as desired when the implement 100 is in use. The retractable wheels also preferably may be adjusted to control the depth of the implement 100 during operation. In various embodiments, the wheels are located between the ultra-shallow inclined disk blade gangs 120 and the spiral blade reel assemblies 140, but may be located elsewhere.

In various embodiments, the frame 102 is preferably constructed to be singly or multiply foldable for transporting the implement along public roads. Hence, in some embodiments, the frame may have a central segment 103 with one or more pivotally attached side wing segments 104 on each side that may be pivoted by hydraulic actuators 105 to a position (not shown) above the central segment 103 to reduce the width of the implement for compact highway transport.

Figure 3:
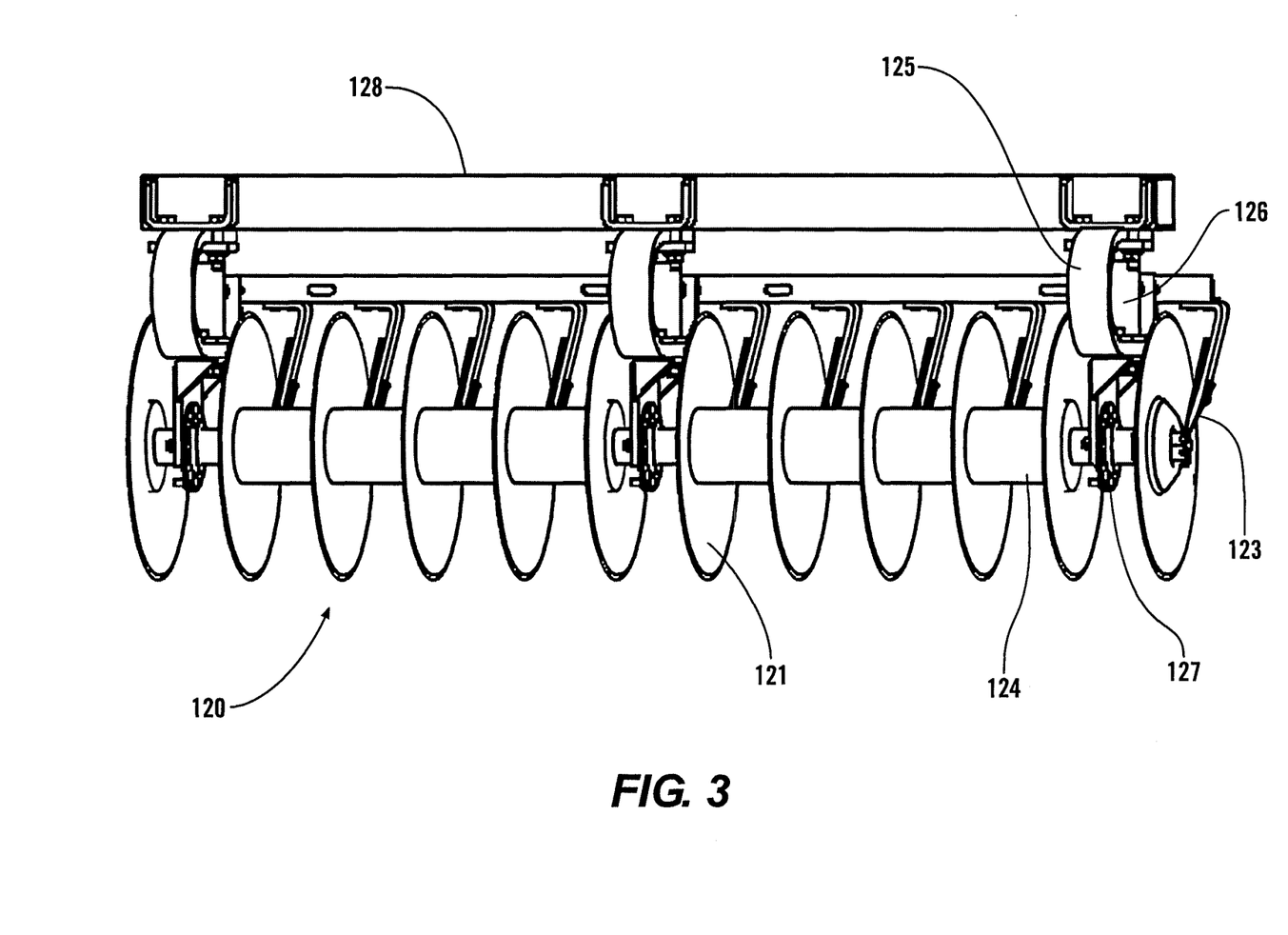
FIG. 3 is a front view of an ultra-shallow inclined disk blade gang according to an exemplary embodiment.
Figure 4:
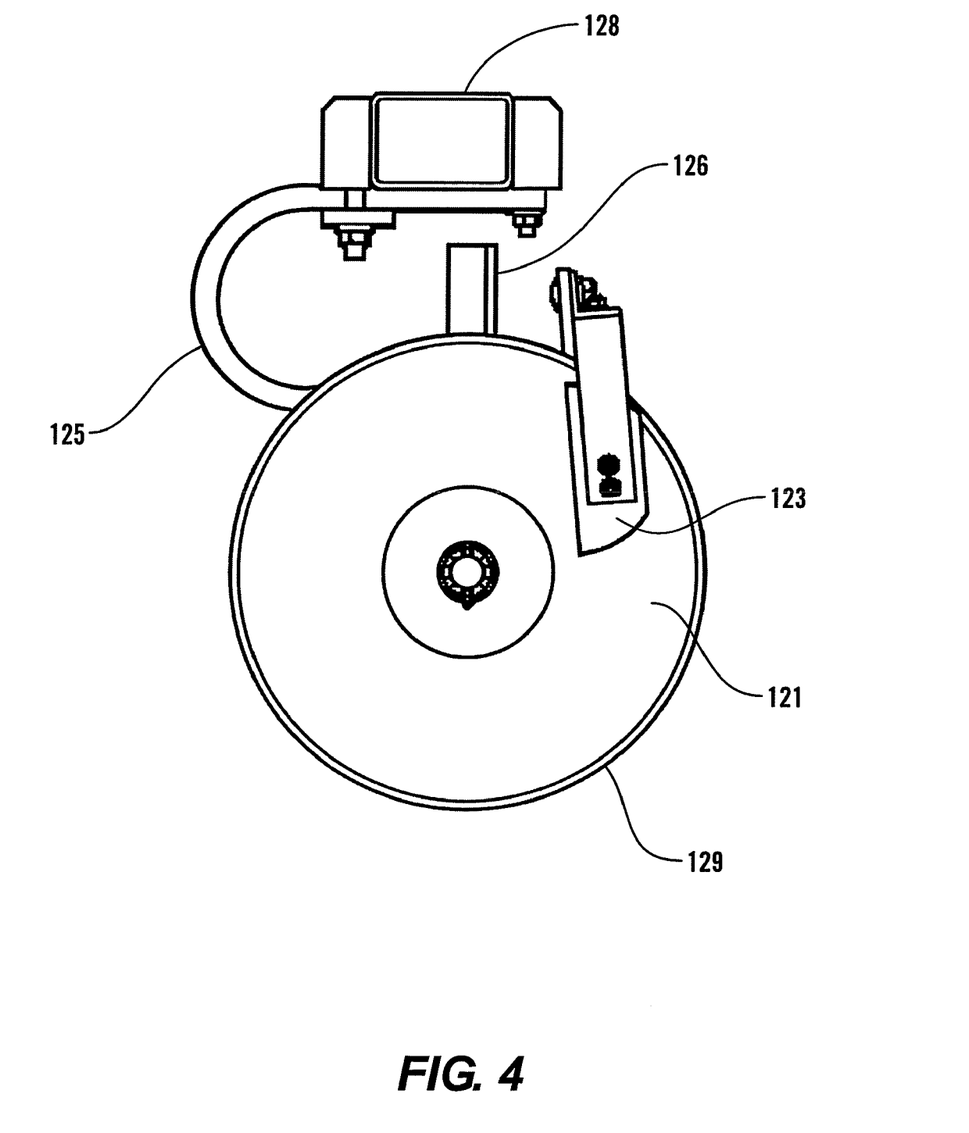
FIG. 4 is a side view of an ultra-shallow inclined disk blade gang according to the embodiment of FIG. 3.

In various embodiments, as illustrated in FIGS. 3 and 4, the ultra-shallow disk blade gangs 120 are attached to C-springs 125. C-springs 125 are attached to crossbeams 128, which are adjustably attached to the frame 102 immediately behind the self-leveling hitch 101. In various embodiments, an ultra-shallow inclined disk blade gang 120 is formed of a horizontal shaft 122 to which a plurality of ultra-shallow inclined disk blades 121 are mounted. In various embodiments, the ultra-shallow inclined disk blades 121 are fixed to the shafts 122, which rotate in bearings 127 mounted to C-springs 125, which are supported from a pivoting crossbeam 128 on several C-springs 125. In various embodiments, the ultra-shallow inclined disk blades 121 on a given horizontal shaft 122 are substantially parallel to one another. In various embodiments, crossbeams 128 are independently adjustable between multiple positions such that the ultra-shallow disk blade gang 120 is angled from about 5 degrees to about 13 degrees relative to perpendicular to the implement's direction of travel (i.e., the ultra-shallow disk blades 121 are angled from about 5 degrees to about 13 degrees relative to parallel to the implement's direction of travel). Because each cross member 128 and ultra-shallow disk blade gang 120 is independently positioned, the ultra-shallow inclined disk blades 121 on different shafts 122 may or may not be at the same angle (i.e., at the same angle relative to direction of travel).

In various embodiments, the ultra-shallow inclined disk blades 121 are adjustably positioned from about 5 degrees to about 13 degrees from parallel to the direction of travel, as opposed to conventional disk blades gangs that operate from about 16 degrees to 22 degrees from parallel. In various exemplary embodiments, the ultra-shallow inclined disk blades 121 may be set at certain fixed angles (e.g., 5 degrees, 7.5 degrees, 10 degrees, and/or 13 degrees).

In various embodiments, an adjustable crossbeam 128 is movable between different positions to adjust the angle of the ultra-shallow inclined disk blade gang 120 to the frame 102. In various embodiments, as shown in FIGS. 3 and 4, scrapers 123 are positioned between the ultra-shallow inclined disk blades 121, and are mounted to the crossbeam 128. The scrapers prevent the buildup of dirt and debris on the front, working sides of the ultra-shallow inclined disk blades 121 or between adjacent ultra-shallow inclined disk blades 121. In various exemplary embodiments, the scraper 123 may have a curved or straight edge.

In various exemplary embodiments, the spiral reel 140 has seven spiral blades 141. In various exemplary embodiments, the spike harrow 160 has three rows of spikes 161 suspended from the frame 102 by chains 163 and projections 164. In various exemplary embodiments, the rolling basket 180 is biased downward by spring 183, which is attached to a projection 164.

Figure 5:
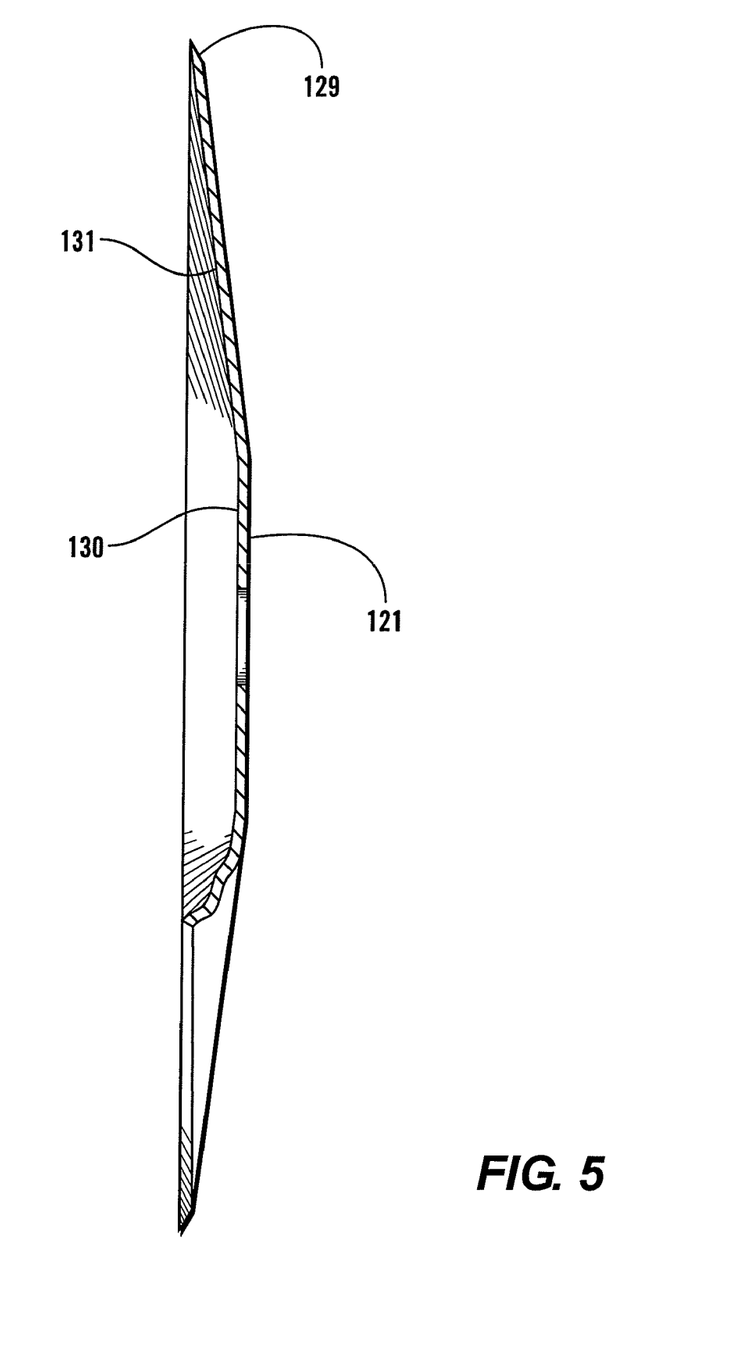
FIG. 5 is a cutout side view of an ultra-shallow inclined disk blade according to an exemplary embodiment.

In various embodiments, as shown in FIG. 5, scrapers 123 and ultra-shallow inclined disk blade assemblies 120 are both attached to C-spring 125, which allows them to move together during operation. In various embodiments, spring stop 126 is attached to the C-spring 125 to prevent excessive bending.

In various embodiments, as shown in FIG. 5, the ultra-shallow inclined disk blade 121 has a diameter of approximately 20 inches. In various exemplary embodiments, the concave depression depth (i.e., the distance from the plane of the blade edge to the center of the cup measured perpendicular to the plane of the blade edge) in ultra-shallow inclined disk blade 121 is from about 9/16 inches to about 1.125 inches rather than the conventional depth of about 1.5 inches to 1.75 inches (some conventional shallow blades can have depths as low as 1.32 inches). Thus, the ratio of blade diameter to depression depth may range from 18:1 to 36:1 In various other exemplary embodiments, the depression depth of a 20 inch blade may be, for example, 5/8 inches (i.e. a ratio of about 32:1), 21/32 inches (i.e., about 30:1), 11/16 inches (i.e., about 29:1), 3/4 inches (i.e., about 27:1), 13/16 inches (i.e., about 25:1), 27/32 inches (i.e., about 24:1), 7/8 inches (i.e., about 23:1), 29/32 (i.e., about 22:1), 15/16 (i.e., about 21:1), and/or 1 inch (i.e., about 20:1). In various exemplary embodiments, the range of possible diameter to depression depth ratios include any combination of the above examples. Although the present disclosure describes disks with a 20 inch diameter, the disclosed disks may have larger or smaller diameters within the scope of the invention.

Figure 6:
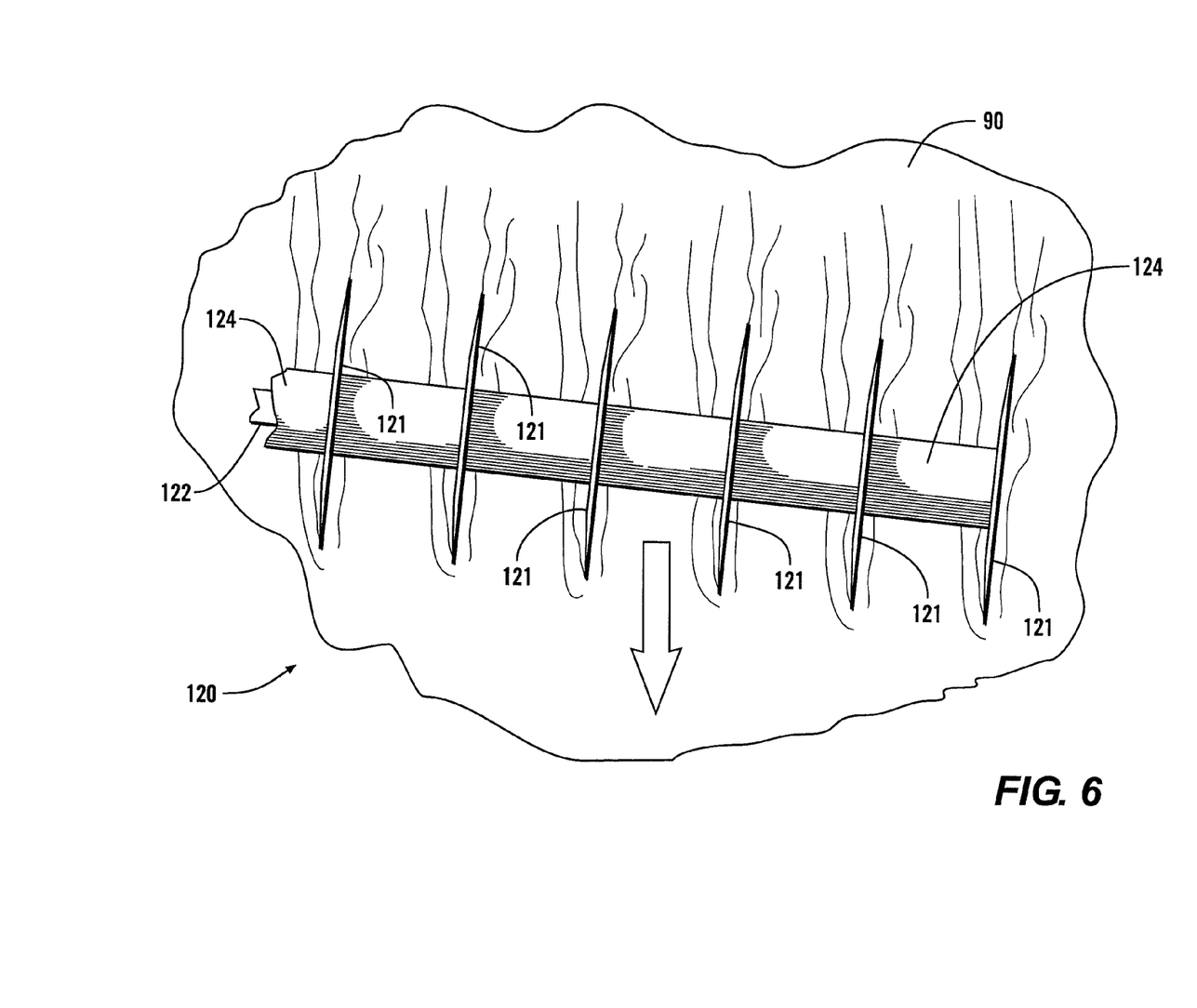
FIG. 6 is partial top view of a blade assembly according to an exemplary embodiment.

In various embodiments, the shafts 122 are rotatably mounted to the frame 102 so as to extend generally from about 5 degrees to about 13 degrees from perpendicular to the implement's direction of travel when pulled by the tractor 190. As shown in FIG. 6, the ultra-shallow inclined disk blades 121 are mounted generally perpendicular to the shafts 122, and thus, when drawn across the field will extend vertically into the top soil, slicing through the surface material. The angled blade gang thus achieves a shallow cutting action and limited sideward displacement of some top soil with minimal soil compaction.

In various embodiments, the ultra-shallow inclined disk blade 121 has a beveled edge 129 to facilitate cutting crop residue. In the embodiment of FIG. 5, the cutting edge 129 is beveled on the back side. In other embodiments, the cutting edge may be beveled on either or both sides.

In various embodiments, the ultra-shallow inclined disk blades 121 may be from about 15 inches to about 35 inches in diameter, and will typically extend about two to three inches into the ground (this depth may be adjustable by raising or lowering the wheels 106). In various embodiments, the shafts 122 are 1½ inches square, and the ultra-shallow inclined disk blades 121 have a diameter of about 20 inches and are spaced approximately 7 inches apart, with spacers 124 positioned between the ultra-shallow inclined disk blades 121. Typically, conventional devices use disks that are spaced about 7.5 to 9 inches apart. The spacers 124 may be cylindrical pipes with a vertical plate in the center having a square hole through which the shaft 122 extends. In other embodiments, the ultra-shallow inclined disk blades 121 and other components may be larger or smaller.

In various exemplary embodiments, as illustrated in FIG. 5, the front, working side of the ultra-shallow inclined disk blade 121 has a flat central section 130 and inclined away from flat elsewhere. In various exemplary embodiments, the shallow angled, substantially frustoconical portion 131 is inclined at about 5 degrees from the flat central section 130. As discussed above, in various exemplary embodiments, the blades 121 of the ultra-shallow disk blade gang 120 are angled from 5 degrees to 13 degrees. Deploying the gang blades 121 at angles of 5 degrees or greater insures that only the front, working side of the blades 121 impact the soil during operation. In various exemplary embodiments, the shape of the ultra-shallow inclined disk blade 121 may be varied (e.g., the back side may have a greater or lesser angle).

As illustrated in FIGS. 3 and 6, unlike with conventional blade assemblies, the ultra-shallow inclined disk blades 121 in an ultra-shallow inclined disk blade gang 120 do not overlap. Thus, not all of the top soil over which the implement passes is directly contacted by a ultra-shallow inclined disk blade 121, leaving an area of little or no impact between the paths of adjacent blades (in various embodiments, other implements may subsequently lightly engage these areas of top soil).

The angled blade gang design with ultra-shallow inclined disk blades achieves good soil loosening without undesirable soil penetration or compaction. The unconventional ultra-shallow disk design also permits a greater range of angles at which the ultra-shallow inclined disk blades 121 may be set. Conventional inclined disk blades need to be operated at angles around 16 degrees to 22 degrees from the direction of travel, which causes significant horizontal tillage and resultant sub-soil compaction. However, the ultra-shallow inclined disk blades of the present disclosure are effective at angles as low as about 5 degrees to 13 degrees from the direction of travel. Reducing the gang angle reduces the amount of lateral soil movement and the extent to which crop surplus is buried and how much is left as ground cover. Increasing the gang angle increases soil movement and buries more residue. Thus, the disclosed blade gang design allows the user to control the amount of residue left on top of the top soil.

As shown in FIG. 5, in various embodiments, the ultra-shallow inclined disk blade 121 has a flat central section 130, a substantially frustoconical shallow-angled inclined portion 131, and a beveled edge 129. In other embodiments, the ultra-shallow inclined disk blade 121 may have other shapes. For example, it may be curved. The two sides of ultra-shallow inclined disk blade 121 may be of the same shape, but this is not required. The edge of ultra-shallow inclined disk blade 121 may be beveled on either or both sides.

In various embodiments, the front side of the ultra-shallow inclined disk blades 121 engages the top soil. As shown in the drawings, in various embodiments, the ultra-shallow inclined disk blade gangs 120 are positioned such that they are forward swept (the outer end of an ultra-shallow inclined disk blade gang 120 is further forward than the inner end), but this is not required. In various embodiments, the ultra-shallow inclined disk blades 121 are positioned about 7 inches apart.

In various embodiments, the outermost blade on both sides is a straight coulter blade (not shown) rather than ultra-shallow inclined disk blade 121. The straight blade is generally parallel to the ultra-shallow inclined disk blades 121 in the same ultra-shallow inclined disk blade gang 120. A straight blade at this location is less prone to create ridges along the sides of the implement's path, which yields a smoother surface without needing to operate the implement with as much overlap in passes across the field.

In various embodiments, the total width of the implement 100 and the various tilling assemblies may be varied—e.g., from about 14 feet wide to 46 or more feet wide. The implement is optimally pulled over the field at approximately 6 to 9 miles per hour. The implement has several advantages over some prior art approaches. The tilling assemblies are mounted to the frame with only minimal horizontal tillage capabilities provided by the ultra-shallow inclined disk blade gang 120 with ultra-shallow inclined disk blades 121. No cultivator shanks or cultivator sweeps are mounted to the frame. Because there is minimal horizontal tillage, variations in soil density layers are minimized while still loosening the top soil to increase the effectiveness of the spiral reel 140. The implement 100 also offers the advantage of speed, which contributes to reduced costs.

As the implement 100 is pulled through a field, the shallow-angled ultra-shallow inclined disk blade gang 120 with ultra-shallow inclined disk blades 121 cut lengthwise through the field residue, with highly desirable but minimal effective soil displacement, and into the top soil. Immediately following that, the spiral reel 140 cuts the same residue crosswise, again with highly desirable but minimal horizontal soil displacement. Immediately after that, the harrow assembly 160 disperses the cut residue and soil in a smooth even pattern. Finally, the single rolling basket 180 finishes the top soil preparation. All the assemblies on the implement 100 thus work together in a lightly penetrating way to achieve an excellent mixed final seedbed.

In various exemplary embodiments, as shown in FIG. 7, the innermost or centermost ultra-shallow inclined disk blade gangs 120 are approximately oppositely angled (e.g., the inner ends of both blade gangs are angled back from their outer ends). In various exemplary embodiments, the ultra-shallow inclined disk blade gangs 120 are forward swept (see FIGS. 1 and 7). In such embodiments, lateral displacement of soil is always away from the center of the implement 100, creating the potential for formation of a small trough or trench between the two innermost ultra-shallow inclined disk blade gangs 120. In various exemplary embodiments, one or more center blade assemblies 110 are located behind the gap between the two innermost ultra-shallow inclined disk blade gangs 120. The center blade assembly 110 includes two disks 111 mounted on separate C-springs 112. In various exemplary embodiments, the disks 111 are angled such that they move a small amount of soil back to the center eliminating any trench formed by the two innermost ultra-shallow inclined disk blade gangs 120. In various exemplary embodiments, the disks 111 may be ultra-shallow inclined disks or any other type of disk. In various exemplary embodiments, the disks 111 are mounted on springs 112. In various exemplary embodiments, the angle of the disks 111 may be adjusted (e.g., by adjusting how the center blade assembly 110 is mounted to the frame).

In various exemplary embodiments, the ultra-shallow inclined disk blade gangs 120 are forward-swept. In other exemplary embodiments, the ultra-shallow inclined disk blade gangs 120 may be back-swept.

It should be noted that although a preferred embodiment is illustrated and described, an implement of this invention may be formed of varying dimensions and construction to suit particular requirements. Other conventional blade gangs, reels, and flexible harrows may be substituted for the ones illustrated and described, and different mounting and actuation hardware may be employed.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be appreciated that the construction and arrangement of the implement, as shown in the various exemplary embodiments, is illustrative only. While the implement, according to this invention, has been described in conjunction with the exemplary embodiments outlined above, various alternatives, modifications, variations, improvements, and/or substantial equivalents, whether known or that are or may be presently unforeseen, may become apparent. Accordingly, the exemplary embodiments of the implement, according to this invention, as set forth above, are intended to be illustrative, not limiting. Various changes may be made without departing from the spirit and scope of the invention. Therefore, the description provided above is intended to embrace all known or later-developed alternatives, modifications variations, improvements, and/or substantial equivalents.

What is claimed is:

1. A minimal tillage agricultural implement, comprising:
a frame having a hitch for attachment to a vehicle, the hitch being pivotally coupled to the frame with a linear adjustment mechanism pivotally attached to both the hitch and the frame; and
a closely coupled tillage unit, comprising:
a plurality of ultra-shallow disk blade gangs coupled to the frame rearwardly of the hitch, the ultra-shallow disk blade gangs having a plurality of ultra-shallow disk blades wherein the blades are aligned from about 5 degrees to about 13 degrees from parallel to the implement's direction of travel;
at least two transversely spaced wheels adjustably coupled to the frame, each wheel being respectively rearwardly adjacent to one of the ultra-shallow disk blade gangs and in close proximity to the respective ultra-shallow disk blade gang; and
a plurality of coaxially aligned spiral reel assemblies coupled to the frame wherein at least one such spiral reel assembly is positioned rearwardly adjacent to at least one of the wheels and in close proximity to the at least one of the wheels;
wherein the ultra-shallow disk blades have a depression depth, a diameter, and a ratio of diameter to depression depth from about 23:1 to about 36:1; and
wherein the ultra-shallow disk blades have a depression depth of about 20 inches; and
wherein the frame extends rearwardly from the hitch and is capable of being pulled by the vehicle and hitch in a direction of travel; and
wherein the spiral reel assemblies are coupled to the frame with their axles substantially perpendicular to the implement's direction of travel; and
wherein the depth to which the ultra-shallow disk blades and the spiral reels penetrate the ground is selected by adjustment of the linear adjustment mechanism; and
wherein the ultra-shallow disk blade gangs and the spiral reel assemblies of the closely coupled tillage unit may be maintained at substantially the selected depth during minimal tillage operations.

2. The minimal tillage agricultural implement of claim 1 further comprising:
a plurality of frame portions extending rearwardly from the frame; and
at least one harrow assembly coupled to the rearwardly extending frame portions and positioned rearwardly of the spiral reel assemblies.

3. The minimal tillage agricultural implement of claim 1 wherein the ultra-shallow disk blades have a ratio of diameter to depression depth from about 24:1 to about 32:1.

4. The minimal tillage agricultural implement of claim 1, wherein the ultra-shallow disk blade gangs further comprise:
a shaft on which a plurality of ultra-shallow disk blades are mounted;
a crossbeam positioned upwardly of the ultra-shallow disk blades, and pivotably coupled to the frame; and
at least one spring assembly connecting the crossbeam and the shaft, thereby resiliently coupling the shaft and the ultra-shallow disk blades to the frame;
wherein the plurality of ultra-shallow disk blades are capable of rotation about a central axis generally corresponding to the shaft.

5. The minimal tillage agricultural implement of claim 1 wherein the ultra-shallow disk blades are about 7 inches apart.

6. The minimal tillage agricultural implement of claim 1 wherein adjacent ultra-shallow disk blades do not overlap in the direction of travel.

7. The minimal tillage agricultural implement of claim 2 further comprising a rolling basket resiliently coupled to the rearwardly extending frame portions and positioned rearwardly of the harrow assembly.

8. The minimal tillage agricultural implement of claim 1 wherein the closely coupled tillage unit further comprises at least one center blade assembly coupled to the frame and located substantially in the space between the at least two wheels.

9. The minimal tillage agricultural implement of claim 1 wherein the frame has a central segment and one or more wing frame segments pivotally attached to each side of the central segment, and wherein each wing folds to a position above the central segment allowing the implement to be narrow enough for transportation on public roadways.

10. The minimal tillage agricultural implement of claim 1 wherein the front side of the ultra-shallow disk blades further comprise a flat central section, a substantially frustoconical inclined portion, and a beveled edge.

11. The minimal tillage agricultural implement of claim 4 wherein the ultra-shallow disk blades are fixed to the shafts and the shafts rotate in bearings supported from the pivoting crossbeam.

12. The minimal tillage agricultural implement of claim 1 wherein the linear adjustment mechanism is a turnbuckle.

13. The minimal tillage agricultural implement of claim 3 wherein the ultra-shallow disk blades have a ratio of diameter to depression depth from about 25:1 to about 30:1.

14. The minimal tillage agricultural implement of claim 1 wherein the ultra-shallow disk blades have a 20 inch diameter.

15. The minimal tillage agricultural implement of claim 1 wherein the depth to which the at least one disk blade gang and at least one spiral reel assembly extend into the ground may be adjusted by changing the level of the wheels.

16. The minimal tillage agricultural implement of claim 15 wherein the relative depths to which the plurality of ultra-shallow disk blades and the plurality of spiral reels penetrate into the ground are selected by pivoting the frame and closely coupled tillage unit by adjustment of the linear adjustment mechanism.

17. The minimal tillage agricultural implement of claim 1 wherein the ultra-shallow disk blade gangs and the spiral reel assemblies will both run substantially at the selected depth of the disk blade gangs when the wheels are raised to allow the implement to run supported substantially by the disk blade gangs and the spiral reel assemblies.

18. The minimal tillage agricultural implement of claim 13 wherein the ultra-shallow disk blades have a ratio of diameter to depression depth from about 27:1 to about 30:1.

* * * * *

UNITED STATES PATENT AND TRADEMARK OFFICE
CERTIFICATE OF CORRECTION

| | | |
|---|---|---|
| PATENT NO. | : 8,020,629 B1 | Page 1 of 1 |
| APPLICATION NO. | : 12/470318 | |
| DATED | : September 20, 2011 | |
| INVENTOR(S) | : Stanley McFarlane, Aaron J. Faessler and Rick K. Kohn | |

It is certified that error appears in the above-identified patent and that said Letters Patent is hereby corrected as shown below:

In the Claims

In column 9, lines 26-27 of the issued patent, "a depression depth of about 20 inches" should be -- a diameter of about 20 inches --.

Signed and Sealed this
Twenty-eighth Day of May, 2013

Teresa Stanek Rea
*Acting Director of the United States Patent and Trademark Office*